Jan. 19, 1932.　　　C. G. NAYLOR　　　1,841,974
CLOSURE DEVICE
Filed Aug. 31, 1929　　2 Sheets-Sheet 1
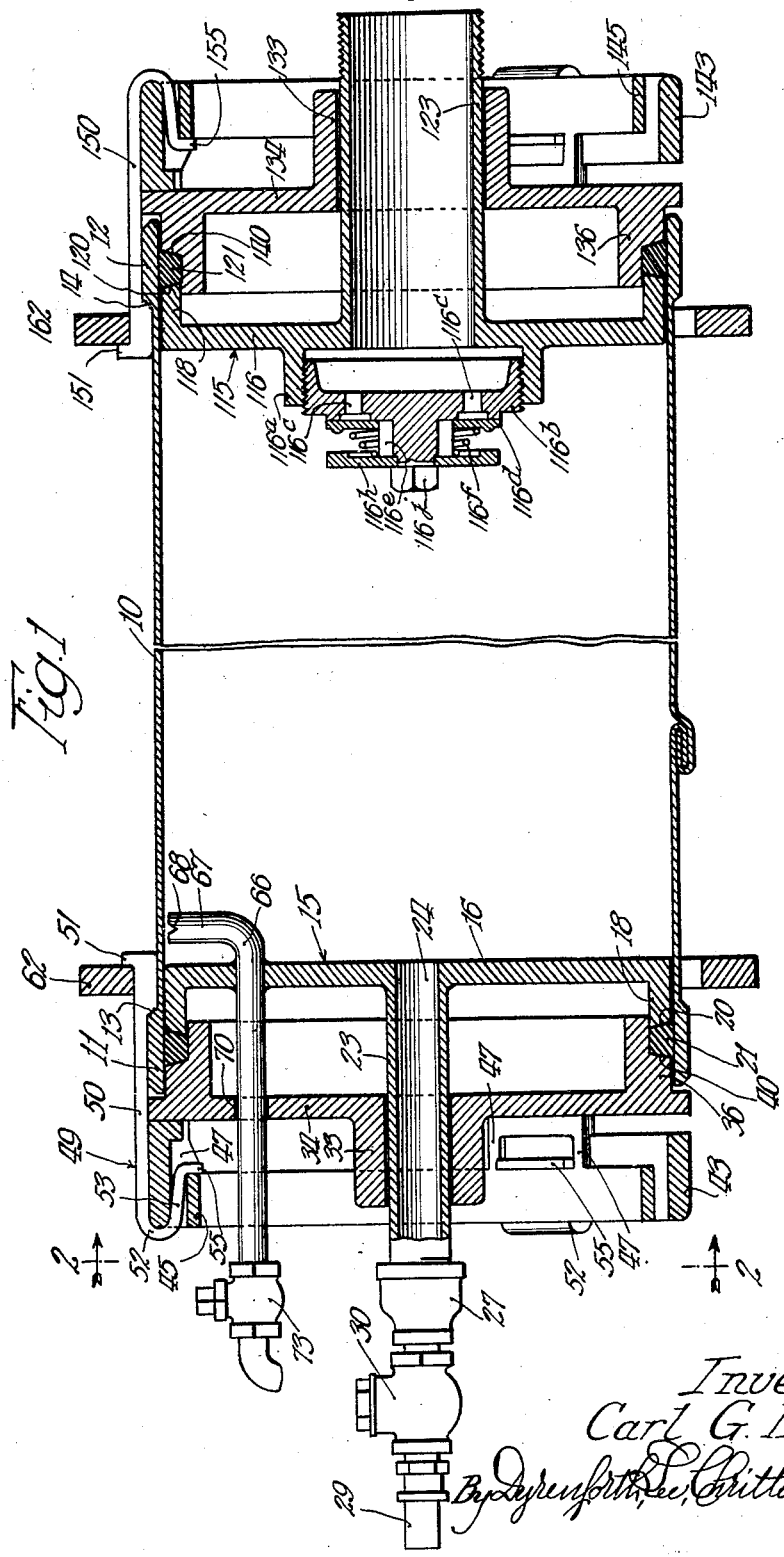
Inventor:
Carl G. Naylor,
By Dyrenforth, Lee, Chritton & Wiles
Attys.

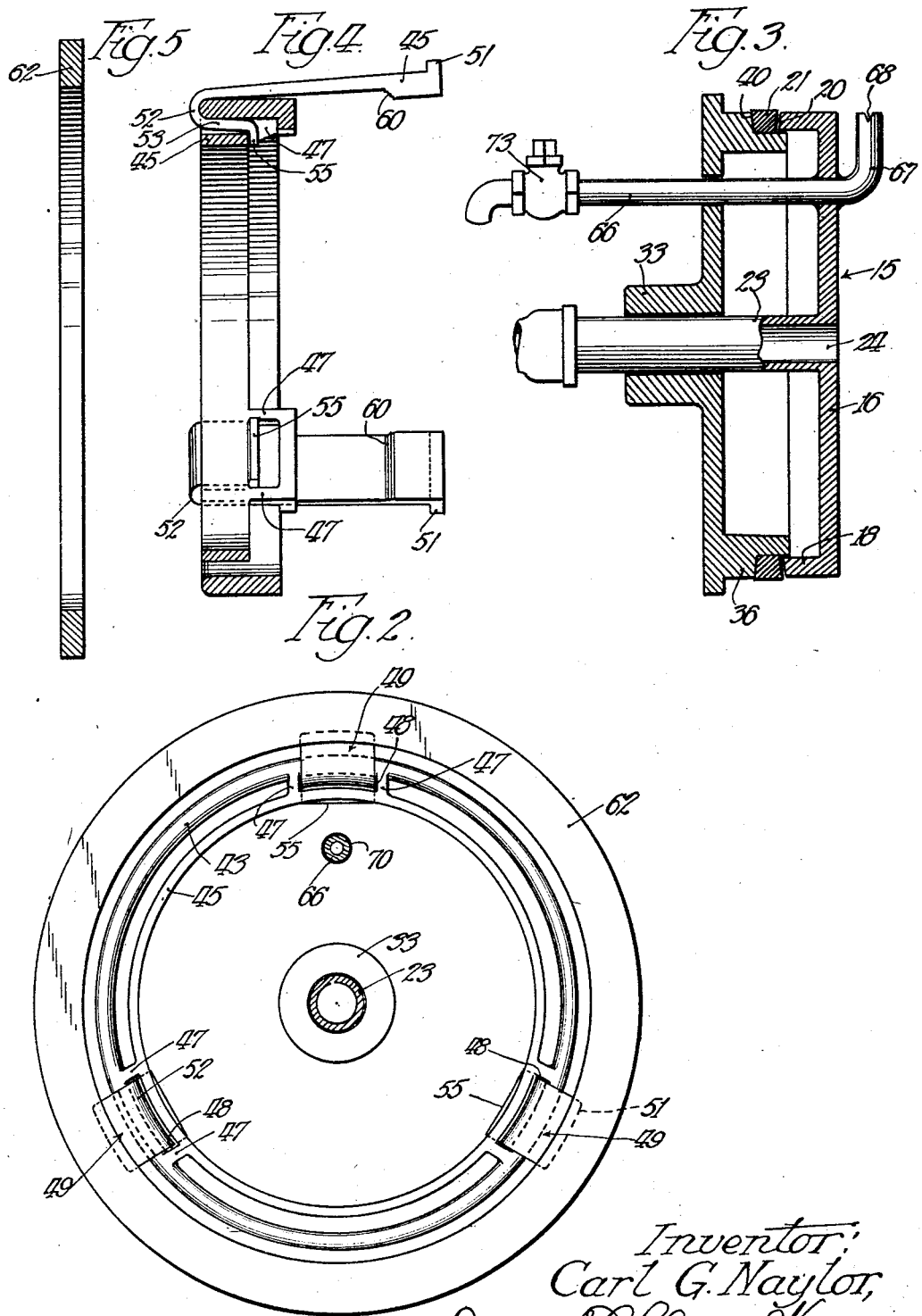

Patented Jan. 19, 1932

1,841,974

UNITED STATES PATENT OFFICE

CARL G. NAYLOR, OF CHICAGO, ILLINOIS, ASSIGNOR TO NAYLOR PIPE COMPANY, OF CHICAGO, ILLINOIS, A CORPORATION OF ILLINOIS

CLOSURE DEVICE

Application filed August 31, 1929. Serial No. 389,714.

My invention relates to closure devices, and has among its other objects the production of the devices of the kind described that are compact, durable and satisfactory for use wherever found applicable.

A particular object of the invention is to provide improved devices of the kind described for sealing the ends of a pipe, or the like.

Another particular object of the invention is to provide an improved closure member which can be quickly and easily attached to the article that is to be sealed.

Still another particular object of the invention is to provide an improved closure device adapted to compress a packing member so that it will seal an opening.

Many other objects and advantages will appear as this description progresses, reference being had to the accompanying drawings, wherein:

Figure 1 is a central longitudinal section taken through a pipe and two closure members with which the invention is embodied.

Fig. 2 is a section taken on line 2—2 of Fig. 1;

Fig. 3 is a section taken on the same line as Fig. 1, through a part of the closure member shown at the left hand end of Fig. 1;

Fig. 4 is a section through a collar provided with latch members, the collar and latch members being parts of the closure member shown at the left of Fig. 1; and Fig. 5 is a section through a ring adapted to cooperate with the latch members shown in Fig. 4.

Referring to Fig. 1 wherein I have shown two closure members in which the invention is embodied, these closure members are adapted to close the ends of a pipe or tube which is to be subjected to relatively high pressure to test it for leaks. The closure members are particularly adapted to be used in connection with the apparatus shown and described in my co-pending application, Serial No. 389,713 filed Aug. 31, 1929.

In Fig. 1, the reference character 10 designates a pipe which is provided at its ends with tubular end pieces 11 and 12, the end pieces 11 and 12 providing annular shoulders 13 and 14, respectively, engageable by latch members hereinafter described. It may be mentioned that the pipe 10 is in this instance, a pipe formed of a plurality of spiral convolutions and that they are secured to each other by a spiral seam. The external diameter of such pipe does not generally conform to standard pipe dimensions and therefore end pieces of internal and external standard pipe dimensions are welded thereto to permit the use of standard couplings, etc., with the pipe.

At the left hand end of Fig. 1, I have shown a closure member which is designated generally by reference character 15 and preferably comprises a disk 16 of a diameter substantially equal to the internal diameter of the pipe or tube 10. At its outer edge the disk 16 is preferably provided with an integral annular flange 18 terminating in a frustro-conical surface 20 engageable with a like surface provided upon a gasket 21, the gasket 21 being preferably formed from rubber, or the equivalent. Preferably formed integral with the disk 15 is a pipe or tube 23 having a passage 24 therethrough which communicates with the interior of the pipe 10. At its outer end the pipe or tube 23 is provided with a reducing coupling 27 and connecting the reducing coupling 27 to a pipe 29 is a valve 30 operable by any suitable tool (not shown). It will be noted that the pipe 23 is loosely fitted and slidably journaled in a boss 33 which is preferably formed integral with a head 34.

The head 34 is preferably provided with an annular flange 36, the largest diameter of which is substantially equal to the internal diameter of the pipe 10. At its outer end the flange 36 is of reduced diameter to provide a frusto-conical surface 40 engageable with a like surface provided upon a gasket 21. Obviously, when the disk 16 is urged toward the head 34 the gasket 21 will be compressed and will prevent leakage of fluid from the pipe.

Means is provided for securing the head 34 and the disk 16 to the pipe 10, which means preferably comprises a collar 43 having an outside diameter substantially equal to the outside diameters of the head 34 and the end piece 11 provided upon pipe 10. Disposed within the collar 43 and preferably formed integral therewith is a ring 45, the ring 45 being joined to the collar 43 by a plurality of integral lugs 47 (see Fig. 2). The lugs 47 are arranged in pairs to provide slots 48 spaced substantially 120° from each other. Associated with each slot 48 is a latch member 49 comprising a bar 50 which terminates at one end in an outwardly extending integral lug 51 and terminates at its other end in a U-shaped end 52 having a short leg 53 loosely mounted in the associated slot 48. The end of the short leg 53 is preferably bent, as at 55, to prevent accidental displacement of the latch member 49 relative to the collar 43.

Referring to Fig. 4, it will be noted that each latch member 49 is preferably provided with a serrated shoulder 60 engageable with the aforementioned annular shoulder 13 provided upon the end piece 11, and referring to Fig. 1, it will be noted that a ring 62 encircling the several latch members prevents them from being accidentally disengaged from the annular shoulder 13. Obviously, when the ring 62 is in place, the closure member 15 is locked securely to the left hand end of the pipe 10.

Projecting through the disk 16 and preferably welded thereto is a pipe 66, having a bent end 67 which terminates in close proximity to the interior surface of the pipe 10, the bent end 67 being preferably provided with a plurality of notches 68 to insure communication between the interior of the pipe 10 and the interior of the pipe 66. The pipe 66 projects through an aperture 70 provided in the head 34 and at its outer end is provided with a valve 73 operable by any suitable tool (not shown).

The closure member shown at the right hand end of the pipe 10 in Fig. 1 is designated generally by reference character 115, and preferably comprises a disk 116 which is preferably of substantially the same diameter as the internal diameter of the pipe 10. An annular flange 118 formed integral with the disk 116 terminates in a frustro-conical surface 120 engageable with a like surface formed upon a gasket member 121, the external diameter of the gasket member 121 being substantially equal to the inside diameter of the pipe 10. Also formed integral with the disk 116 is a tube 123 of relatively large diameter. The inner surface of the disk 116 is provided with an integral annular flange 116a into which a valve member 116b is screw threaded. The valve member 116b is provided with a plurality of ports 116c which communicate with the tube or pipe 123 and with the interior of the pipe 10 when a valve disk 116d is unseated. The valve disk 116d is slidably journaled upon a post 116e, preferably formed integral with the valve member 116b and a compression spring 116f interposed between the valve disk and a washer 116h tends to hold the valve 116 seated upon the valve member 116b in such manner that the ports 116c will be closed. A nut 116j is screw-threaded upon the outer end of the post 116e and rigidly secures the washer 116h to the post.

The tube or pipe 123 is slidably and loosely journaled in a bore provided in a boss 133 which is preferably formed integral with a head 134, the head 134 being preferably provided with an annular flange 136, the largest diameter of which is preferably substantially identical to the interior diameter of the pipe 10. The outer end of the flange 136 is preferably of reduced diameter to provide a frustro-conical surface 140 engageable with a like surface formed upon the gasket 121.

The flange 118 upon the disk 116 provides a bore into which the reduced end of the flange 136 may telescope, and it is obvious that the disk 116 and the head 134 may be displaced towards each other to compress the gasket 121 and thus seal the right hand end of the pipe 10. Like construction is employed in the closure device 15.

The means for securing the disk 116 and the head 134 to the right hand end of the pipe 10 are preferably substantially identical with the above described means for securing the head 34 and the disk 16 to the left hand end of the pipe 10, and are identified by the same reference characters. It will be noted that the serrated shoulders 60 of the latch members 50 at the right hand end of the pipe 10 engage the annular shoulder 14 of the end piece 12.

As set forth above the closure members 15 and 115 are particularly adapted to be employed in connection with testing apparatus shown and described in my co-pending application, Serial No. 389,713 filed Aug. 31, 1929, and when so used, the method practiced is as follows: Assuming that the pipe 10 is to be tested for leaks, it is readily apparent that the closure members 15 and 115 may be quickly and easily secured in place upon the ends of the pipe and locked thereto through the medium of the latch members 50. It is then my practice to connect the pipe 123 of the closure member 115 to a supply of liquid under relatively low pressure to fill the pipe 10 with the liquid, the spring 116f being adjusted so that the valve disk 116d will be displaced by the pressure of the incoming liquid and thus open the ports 116c. Before the liquid under relatively low pressure is admitted into pipe 10, it is rolled into a position wherein the bent end 67 of the pipe 66 occupies the highest point within the pipe, and for this purpose I generally elevate the left hand end of the pipe slightly with respect to the right hand end thereof. The valve 33 is left open during the filling process, but as soon as liquid is discharged through the valve it is closed as this indicates that the pipe is full of liquid. The valve 30 remains closed during the time the pipe is being filled with low pressure liquid. After the valve 73 has been closed, the pipe 29 is connected to a supply of liquid under relatively high pressure and the valve 30 is open, whereupon the pressure in the pipe 29 raises the pressure within the pipe 10 to an equal value and any leaks in the walls or seams thereof will become apparent as tiny streams of liquid or a spray will issue therefrom. These leaks may be chalk marked, or the like, for repairs, after which the valve 30 is closed and the pipes 29 and 123 are disconnected from the sources of liquid under high or low pressures, respectively. While the pipe 10 is being subjected to the relatively high pressure, a valve (not shown) positioned between the pipe 10 and the source of low pressure liquid is closed. The closure members 15 and 115 are then removed from the ends of the pipe 10 and the liquid therein is discharged into a suitable drain.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I claim as new is:—

1. A device of the kind described for closing an opening in a hollow member, said device comprising a disc disposed within said hollow member and subjected to pressure therein, a head alined with said disc, a gasket disposed between said disc and said head and compressible thereby to form a fluid-tight seal at said opening, a collar, a plurality of latch-members loosely pivoted to said collar and adapted to co-operate therewith to secure said head to said hollow member, and means for locking said latch-members in their functionally operative positions.

2. A device of the kind described for closing an opening in a hollow member, said device comprising means disposed in said hollow member and subjected to pressure therein, said means having a pipe projecting therefrom whereby fluid is introduced into said hollow member, a valve for controlling the flow of fluid through said pipe, a head having an aperture through which said pipe passes, a gasket disposed between said means and said head and compressible thereby to form a fluid-tight seal at said opening, a collar, latch-members carried by said collar for detachably securing said head to said hollow member, and a ring for holding said latch-members in their functionally operative positions.

3. A device of the kind described for closing an opening in a hollow member, said device comprising means disposed in said hollow member and subjected to pressure therein, said means having a pipe projecting therefrom whereby fluid is introduced into said hollow member, a valve for controlling the flow of fluid through said pipe, yielding means for holding said valve in its closed position, a head having an aperture through which said pipe passes, a gasket disposed between said means and said head and compressible thereby to form a fluid-tight seal at said opening, a collar, latch-members for detachably securing said head to said hollow member, and a ring for holding said latch-members in their functionally operative positions.

4. A device of the kind described for closing an opening in a hollow member, said device comprising means disposed in said hollow member and subjected to pressure therein, said means having a pipe projecting therefrom whereby fluid is introduced into said hollow member, a head having an aperture through which said pipe passes, a gasket disposed between said means and said head and compressible thereby to form a fluid-tight seal for said opening, a collar, a plurality of latch-members loosely pivoted to said collar and co-operating therewith to secure said head to said hollow member, and means engageable with said latch-members for securing them in their functionally operative positions.

5. A device of the kind described for closing an opening in a hollow member, said device comprising a disc disposed within said hollow member and having an annular flange thereon, a head having a flange arranged to telescope into said flange on said disc, a gasket disposed between said disc and said head and compressible thereby to form a fluid-tight seal at said opening, a collar, a plurality of latch-members loosely pivoted to said collar and co-operating therewith to secure said head to said hollow member, and a ring for securing said latch-members in in their functionally operative positions.

6. A device of the kind described for closing an opening in a hollow member, said device comprising a disc disposed within said hollow member and provided with an annular flange in its periphery, a head, a gasket compressible between said annular flange and said head for forming a fluid-tight seal at said opening, a collar resting on said head, a plurality of latch-members loosely pivoted to said collar and co-operating therewith to secure said head to said hollow member, and a ring for locking said latch-members in their functionally operative positions.

7. A device of the kind described for closing an opening in a hollow member, said device comprising a disc disposed within said hollow member, a head, a gasket compressible between said disc and said head for forming a fluid tight seal at said opening, a collar abutting against said head, a plurality of latch-members loosely pivoted to said collar and co-operating therewith to secure said head to said hollow member, and a ring for locking said lacth-members in their functionally operative positions.

8. A device of the kind described for closing an opening in a hollow member, said device comprising a disc disposed within said hollow member, a pipe projecting through said disc and having its inner end bent to locate its inner opening in close proximity to an interior surface of said hollow member, a head having an aperture through which said pipe passes, a gasket compressible between said disc and said head for forming a fluid-tight seal at said opening, a collar abutting against said head, a plurality of latch-members carried by said collar and co-operating therewith to secure said head to said hollow member, and a ring for locking said latch-members in their functionally operative positions.

9. A device of the kind described for closing an opening in a hollow member, said device comprising a disc disposed within said hollow member and subjected to pressure therein, a head, a gasket compressible between said disc and said head for forming a fluid-tight seal at said opening, a collar abutting against said head, a plurality of latch-members carried by said collar and co-operating therewith to secure said head to said hollow member, and a ring for locking said latch-members in their functionally operative positions.

In testimony whereof, I have hereunto set my hand this 12th day of June, 1929.

CARL G. NAYLOR.